United States Patent [19]

Hwang

[11] Patent Number: 5,729,386
[45] Date of Patent: Mar. 17, 1998

[54] LIGHT PROJECTION METHOD AND A PROJECTION TYPE IMAGE DISPLAY APPARATUS FOR PERFORMING THE SAME

[75] Inventor: Jin Hwang, Incheon, Rep. of Korea

[73] Assignee: Daewoo Electronics Co., Ltd., Seoul, Rep. of Korea

[21] Appl. No.: 738,867

[22] Filed: Oct. 28, 1996

[30] Foreign Application Priority Data

Oct. 27, 1995 [KR] Rep. of Korea ............... 95-37474

[51] Int. Cl.$^6$ ..................... G02B 27/10; F21V 29/00
[52] U.S. Cl. ..................... 359/618; 359/619; 362/268
[58] Field of Search ..................... 359/618, 619, 359/626; 362/268

[56] References Cited

U.S. PATENT DOCUMENTS

| | | | |
|---|---|---|---|
| 4,459,813 | 7/1984 | Petta | 62/132 |
| 5,098,184 | 3/1992 | Van Den Brandt et al. | 353/102 |
| 5,459,592 | 10/1995 | Shibatani et al. | 359/40 |
| 5,499,138 | 3/1996 | Iba | 359/569 |
| 5,519,518 | 5/1996 | Watanabe et al. | 359/40 |

*Primary Examiner*—David C. Nelms
*Assistant Examiner*—Ricky Mack
*Attorney, Agent, or Firm*—Beveridge, DeGrandi, Weilacher & Young LLP

[57] ABSTRACT

Disclosed is a light projection method and a projection type image display apparatus for performing the same. The projection type image display apparatus can obtain a uniformity of brightness of a pixel by controlling a brightness of a screen in a pixel unit forming an image. A micro lens array is installed to the front surface of an actuated mirror array. A light generated from a light source of optical energy is transformed to a parallel light by a field lens, and the transformed parallel light is condensed in the pixel unit by a micro lens corresponding to an individual pixel unit. The condensed light passing through the micro lens is reflected from a mirror of the actuated mirror array. The reflected light passes through another micro lens adjacent to the micro lens and forms an image on a screen. As a result, a light modulation in the individual pixel unit can be accomplished with ease. Also, the brightness of an image displayed on a screen is increased by concentrating with the micro lens and reflecting it. Also, a color filter is installed to the front of the micro lens. The color filter only allows for red, blue and green light to penetrate. The actuated mirror array controls the light path corresponding to the individual color. Therefore, a color image can be formed by using a single actuated mirror array.

16 Claims, 4 Drawing Sheets

LIGHT PROJECTION METHOD AND A PROJECTION TYPE IMAGE DISPLAY APPARATUS FOR PERFORMING THE SAME

BACKGROUND OF THE INVENTION

1. Field of the Invention

The present invention relates to a light projection method and a projection type image display apparatus for performing the same, and more particularly to a light projection method which is capable of increasing the uniformity of an image displayed on a screen by using an actuated mirror array (hereinafter referred to as "AMA"), and a projection type image display apparatus for performing the same.

2. Description of the Prior Art

Generally, spatial light modulators for projecting an optical energy on a screen have many possible applications such as an optical communication, an image processing, and information display devices.

Typically, the spatial light modulators are classified into direct view type image display apparatuses and projection type image display apparatuses in accordance with a method for displaying the optical energy on the screen. A cathode ray tube (CRT) may be mentioned as an example of the direct view type image display apparatus. The CRT displays an image having an excellent quality, but cannot be employed on a screen of a large scale. If CRT is employed on a large screen, the weight and the volume of CRT are highly increased. As a result, the manufacturing cost of CRT is increased.

A liquid crystal display (hereinafter referred to as "LCD"), a deformable mirror device (hereinafter referred to as "DMD") and an actuated mirror array (hereinafter referred to as "AMA") may be examples of projection type image display apparatuses.

LCD can be classified as a transmissive spatial light modulator. LCD is an image display apparatus having a simple structure. But LCD has a poor light efficiency due to a light polarization and other problems inherent in liquid crystal materials such as a sluggish response and an overheating. Also, LCD has a great light loss due to a polarizing plate. Since a thin film transistor for driving LCD is formed at a pixel, the rate for forming an opening is limited to a predetermined range. Further, the best light efficiency of the present transmissive spatial light modulator is limited to 1 to 2%, so the present transmissive spatial light modulator requires a dark room condition for an acceptable display quality.

Meanwhile, DMD and AMA can be classified as reflective spatial light modulators, and have been developed to solve the problems that the LCD type display system possess. DMD has a good light efficiency. But a twisted hinge structure of DMD causes severe fatigue problems. Also, DMD requires a very sophisticated and expensive driving circuitry.

In contrast, U.S. Pat. No. 5,175,465 (issued to Gregory Um et al. on Dec. 29, 1992) discloses an AMA which is a mirror array driven piezoelectrically. The Gregory Um et al.' AMA has a simple structure and a simple operating principle. Also, the AMA provides a high enough light efficiency of more than 10%. Also, the AMA provides a sufficient contrast ratio for a brighter and clearer large projection image at a normal room light condition. Also, the AMA is not affected by a light polarization and does not cause a light polarization. Therefore, the AMA is more efficient than LCD devices. Also, the AMA has a reflective nature which is less sensitive to temperature. Therefore, the AMA provides an advantage that the brightness of a screen is enhanced as compared with other devices which are easily affected by higher powered light sources.

The AMA as above has been used for a display apparatus at the beginning of its development. The AMA is mainly used for a micro actuator consisting of a vertical bimorph structure.

The "Bulk-type AMA" as described above is disclosed in the U.S. Pat. No. 5,175,465. The Bulk-type AMA has a center electrode sandwitched between two piezo layers. The center electrode is connected to an active matrix with a conductive epoxy for transmitting signal voltages. A mirror layer is positioned to the upper portion of the Bulk-type AMA. The mirror layer has a tilt angle of up to ±0.25 degree at a thirty volt maximum. Accordingly, the mirror layer is required for the high precision of the design and manufacturing of the Bulk-type AMA. Also, it is difficult to fabricate a structure of the Bulk-type AMA.

Recently, a thin film actuated mirror array which highly enhances the quality of mirror arrays has been developed. The thin film actuated mirror array is manufactured by using a manufacturing process of the thin film which is well known in the technical field relating to semiconductor. The thin film actuated mirror array has been developed to transmit enough light to a screen for the display of digital images at a normal room light condition with a high brightness and a high contrast. The thin film actuated mirror array is a reflective-type light modulator that uses thin film piezo-electric actuators in conjunction with microscopic mirrors. The thin film actuated mirror array has been developed to have an enhanced tilt angle for providing high contrast and to have enough light efficiency to provide high brightness. Also, the thin film actuated mirror array has been developed to have uniformity at a large scale integration of over 300,000 pixels of a micro mirror in a single panel.

Meanwhile, the thin film actuated mirror array employing the AMA as described above can be divided into two groups consisting of a first group using a one-dimensional AMA and a second group using a two-dimensional AMA. In the one-dimensional AMA, the surfaces of the mirrors are arranged in a M×1 array. In the two-dimensional AMA, the surfaces of the mirrors are arranged in a M×N array. Accordingly, the thin film actuated mirror array employing the one-dimensional AMA scans M×1 lights by using a scanning mirror. The thin film actuated mirror array employing the two-dimensional AMA projects M×N lights and displays an image having an array consisting of M×N pixels.

FIG. 1 schematically illustrates a conventional projection type image display apparatus employing the two-dimensional AMA.

Referring to FIG. 1, the conventional projection type image display apparatus includes a light source 10 of optical energy, a condensing mirror 12, a reflection mirror 14, a field lens 16, an actuated mirror array 20 and a projection lens 18 for projecting an image to a screen (not shown), which are disposed in accordance with a light path.

Light source 10, for example a halogen lamp, emits a white light by using an arc discharge. The light emitted from light source 10 is condensed by condensing mirror 12 and is reflected by reflection mirror 14 at a specific angle.

The light reflected from reflection mirror 14 is collimated to field lens 16 which has a flat surface and a convex surface, and is projected to actuated mirror array 20 in the form of a parallel light. Field lens 16 has a reflective angle on a large scale and prevents the lost of the light reflected by reflection mirror 14. Preferably, field lens 16 reduces the light path.

Actuated mirror array 20 consists of the two-dimensional AMA. That is, actuated mirror array 20 consists of a mirror surface 20c and an actuated mirror array panel 20a. Mirror surface 20c reflects the incident light passing through field lens 16 in order to control the light path corresponding to the predetermined pixels. Actuated mirror array panel 20a has M×N actuators 20b for providing mirror surfaces 20c with a certain tilt angle. Actuated mirror array panel 20a has M×N transistors (not shown), each of which corresponds to the individual pixel. Each of actuators 20b comprises a piezo-electric crystal matrix, and is installed in actuated mirror array panel 20a so that each of actuators 20b is electrically connected with the individual transistor. The piezo-electric crystal is tilted, vibrated, or bent at an angle in accordance with a voltage applied thereto, and causes each of mirror surfaces 20c positioned on the piezo-electric crystal to tilt at an angle.

Meanwhile, the light reflected from mirror surfaces 20c having a tilted angle corresponding to the individual pixel is condensed to projection lens 18 and is projected to the screen (not shown) for displaying an image.

In the conventional projection type image display apparatus as described above, since the light modulation of the total pixels in the actuated mirror array is accomplished by one stop, it is difficult to control the brightness of the screen in the individual pixel unit. Accordingly, the design of the optical system for obtaining a uniformity of brightness by controlling in the individual pixel unit, is highly limited.

Further, in the conventional projection type image display apparatus, it is difficult to create a color by using one actuated mirror array. Therefore, a plurality of actuated mirror arrays for displaying a color image is required. Accordingly, the structure of the conventional projection type image display apparatus is complicated.

SUMMARY OF THE INVENTION

Considering the above mentioned problems, it is a first object of the present invention to provide a light projection method which is capable of obtaining a uniformity of brightness of a pixel in a pixel unit forming an image by controlling a brightness of a screen.

It is a second object of the present invention to provide a projection type image display apparatus suitable for performing the light projection method as described above.

To accomplish the above first object, the present invention provides a light projection method comprising the steps of:

(a) collimating a light to transform the light into a parallel light;

(b) condensing the parallel light; and (c) forming an image on a screen by controlling a light path of the condensed light. The light may be condensed in a pixel unit of a plurality of pixels which are arranged in a matrix form. The light may be condensed in a row unit or in a column unit of a plurality of pixels which are arranged in a matrix form. The light is generated from a light source of optical energy and is primarily reflected. The parallel light is condensed by passing the parallel light through a first micro lens of a micro lens array. At this time, the light having the controlled light path passes through a second micro lens adjacent in a row or column direction to the first micro lens and forms an image.

Preferably, the method further comprises the step of selecting a light having a specific color from the parallel light before or after condensing the parallel light.

To accomplish the above second object, the present invention provides a projection type image display apparatus comprising:

a light source for generating a light;

a condensing means for uniformly condensing the light; and a light modulation means for forming an image by controlling a light path of the condensed light which has passed through the condensing means.

The apparatus further comprises a light reflecting means for reflecting the light generated from the light source; and a parallel light transforming means for collimating the light reflected by the light reflecting means to transform the light into a parallel light.

The condensing means may have a micro lens array having a plurality of micro lenses which are arranged in a matrix form for condensing the light into pixel units. The condensed light in a pixel unit which has passed a first micro lens of the micro lens array, is reflected by the light modulating means to pass a second micro lens adjacent to the first micro lens, thereby forming the image. The condensing means may have a micro lens array having a plurality of micro lenses which are arranged in a stripe form for condensing the light into a row unit of pixel units which are arranged in a matrix form.

The projection type image display apparatus further comprises a projection lens for displaying an image having a suitable size on a screen before the light reflected by the actuated mirror array displays the image on the screen. The micro lens array is disposed in a predetermined manner such that the collimated light in a pixel unit passing through a first micro lens of the micro lens array is reflected by the actuated mirror array, passes through a second micro lens of the micro lens array, and forms the image. The light modulation means includes a plurality of mirror surfaces, a plurality of actuators for respectively supporting and driving the mirror surfaces, and a panel having transistors for driving the actuators by receiving an image signal. The light modulation means includes a mirror part having a plurality of mirrors disposed in the form of a matrix correspondingly to M×N pixels, the condensing means has a micro lens array having (M+1)×N micro lenses disposed in the form of a matrix, and the light reflected by each of the mirrors passes through a second micro lens adjacent in a row direction to a first micro lens through which the light has passed, thereby forming an image. The projection type image display apparatus further comprises a color filter array, in which the color filter array includes color filters corresponding to the micro lenses for forming a color image at positions corresponding to the micro lenses.

According to the present invention, the micro lens array is installed to the front surface of the actuated mirror array. The light generated from the optical energy light source is transformed to a parallel light, and the transformed parallel light is condensed in the pixel unit by the micro lens corresponding to the individual pixel unit. The condensed light passing through the micro lens is reflected from a mirror of the actuated mirror array. The reflected light passes through another micro lens adjacent to the micro lens and forms an image on a screen.

As a result, a light modulation in the individual pixel unit can be accomplished with ease. Also, the brightness of an image displayed on the screen is increased by concentrating the light with the micro lens and reflecting it. Also, a color filter is installed to the front of the micro lens. The color filter only allows for red, blue and green light to penetrate. The actuated mirror array controls the light path corresponding to the individual color. Therefore, a color image can be formed by using a single actuated mirror array.

BRIEF DESCRIPTION OF THE DRAWINGS

The above object and other characteristics and advantages of the present invention will become more apparent by describing in detail a preferred embodiment thereof with reference to the attached drawings, in which.

DESCRIPTION OF THE PREFERRED EMBODIMENT

Hereinafter, the preferred embodiment of the present invention will be explained in more detail with reference to the accompanying drawings.

Embodiment 1

Figure 1:
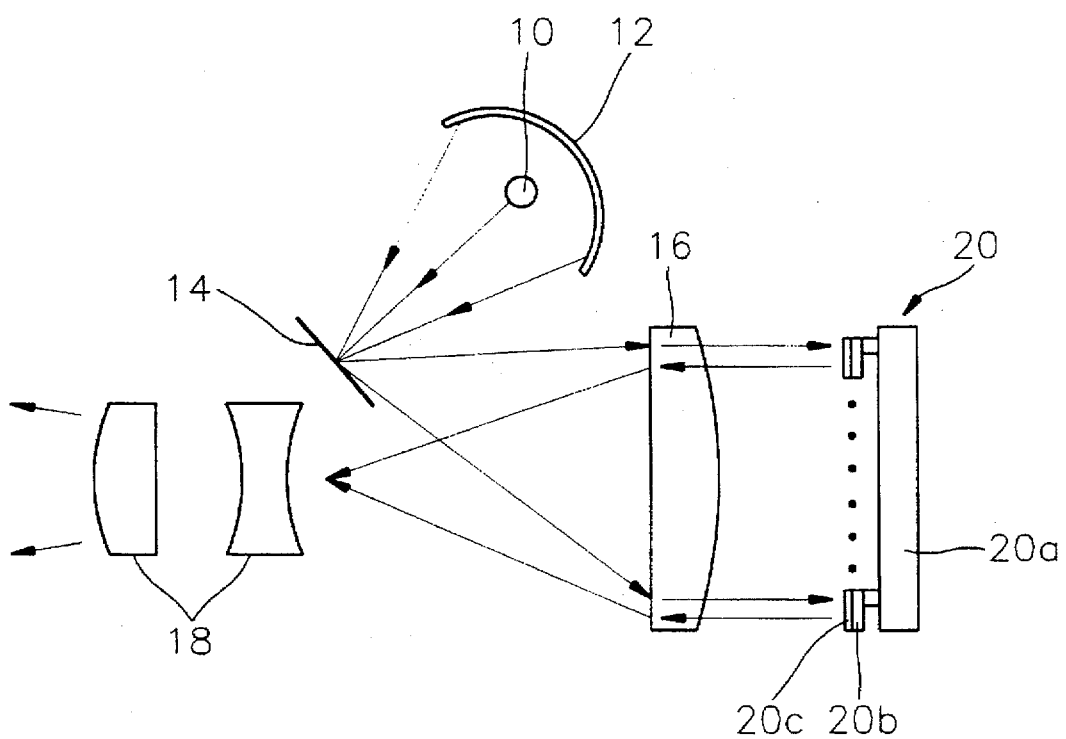
FIG. 1 is a schematic view of an optical system of a conventional projection type image display apparatus.
Figure 2:
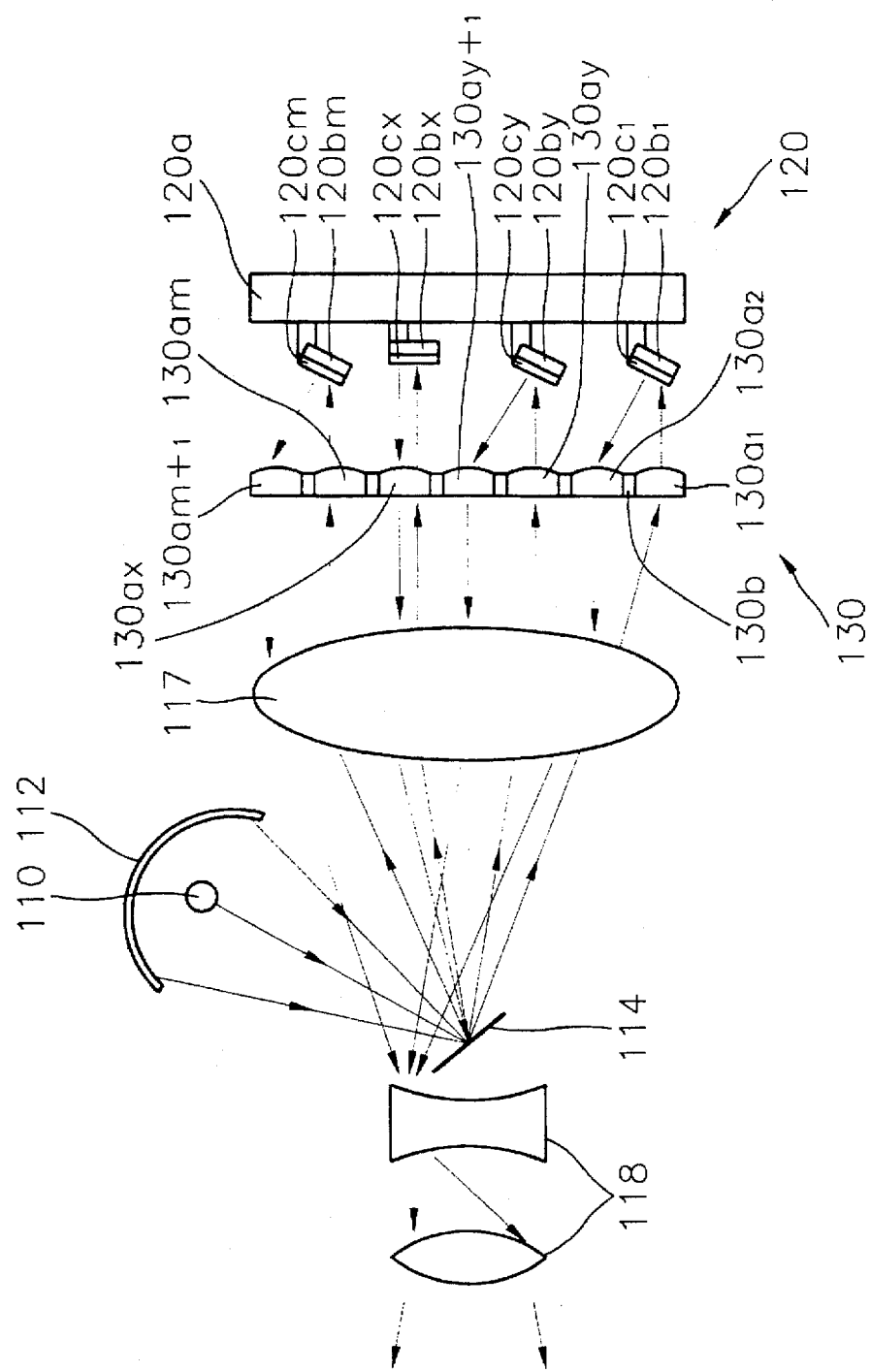
FIG. 2 is a schematic view of an optical system of a projection type image display apparatus according to a first embodiment of the present invention.

FIG. 2 schematically illustrates a projection type image display apparatus according to the first embodiment of the present invention.

Referring to FIG. 2, the projection type image display apparatus according to the present invention includes a light source 110 of optical energy, a condensing mirror 112, a reflection mirror 114, a field lens 117, a micro lens array 130, an actuated mirror array 120 as a light modulator and a projection lens 118 for projecting an image to a screen (not shown), which are disposed in accordance with a light path.

Light source 110, for example a halogen lamp, emits a white light by using an arc discharge. The light emitted from light source 110 is condensed by condensing mirror 112 enclosing the halogen lamp and is reflected by reflection mirror 114 at a specific angle.

The light reflected from reflection mirror 114 is collimated to field lens 117, which comprises a convex lens, and is projected to actuated mirror array 120 in the form of a parallel light. Actuated mirror array 120 has an M×N actuated mirror array.

A micro lens array 130 is disposed in a light path between field lens 117 and actuated mirror array 120. Micro lens array 130 comprises a lens portion 130a which comprises a plurality of micro lenses, which are (M+1)×N micro lenses $130a_1, 130a_2, \ldots 130a_{M+1}$, and a plurality of lens peripheries 130b enclosing lens portion 130a and mask the light. The light can pass through lens portion 130a, but it can not pass through lens peripheries 130b. In micro lens array 130, lens portion 130a can be formed in the form of a stripe in a row unit or in a column unit of a plurality of pixels which are arranged in a matrix form, but is preferably formed as a two-dimensional matrix as described above. Micro lens portion 130a has a plurality of convex micro lenses $130a_1, 130a_2, \ldots 130a_{M+1}$ and condenses (or concentrates) a parallel light which has passed through field lens 117 and has been projected to micro lens portion 130a to a special position corresponding to the individual pixel.

Meanwhile, lens peripheries 130b are made of an opaque material. For example, lens peripheries 130b are formed by coating chromium, which is an opaque material onto the surface of lens peripheries 130b in the form of a black stripe. Micro lens array 130 can be easily manufactured by a well-known method. For example, U.S. Pat. No. 5,150,138 issued to Hirishi Nakanishi et al. discloses a method for condensing the light in a pixel unit by using a micro lens array in a projection type image display employing an LCD. In the present invention, a micro lens array manufactured by using the method disclosed in the above U.S. Patent may be used.

Meanwhile, actuated mirror array 120 as a light modulator consists of the two-dimensional AMA. Actuated mirror array 120 includes a mirror surface 120c consisted of M×N mirror surfaces $120c_1, 120c_2, \ldots 120c_M$. M×N mirror surfaces $120c_1, 120c_2, \ldots 120c_M$ are disposed in the form of a matrix and reflect the light to control the light path to corresponding predetermined pixels, which are in positions in which the incident light is condensed by lens portion 130a of actuated mirror array 130. M×N mirror surfaces $120c_1, 120c_2, \ldots 120c_M$ are mounted on the front surface of mirror array panel 120a and are supported by an actuator portion 120b consisting of actuators $120b_1, 120b_2, \ldots 120b_M$ for tilting mirror surfaces $120c_1, 120c_2, \ldots 120c_M$ at a certain angle in accordance with an electrical image signal applied to actuators $120b_1, 120b_2, \ldots 120b_M$. Actuated mirror array panel 120a includes M×N transistors (not shown) corresponding to the individual pixel. Actuators $120b_1, 120b_2, \ldots 120b_M$, each of which consists of a piezo-electric crystal matrix, are installed in actuated mirror array panel 120a so that actuators $120b_1, 120b_2, \ldots 20b_M$ electrically connect with each of the M×N transistors. The piezo-electric crystal is tilted, vibrated, or bent at an angle in accordance with the voltage applied to thereof, and causes mirror surfaces $120c_1, 120c_2, \ldots 120c_M$ positioned on the piezo-electric crystal to tilt at an angle. Accordingly, an initial light path of the light changes into a new light path by means of mirror surfaces $120c_1, 120c_2, \ldots 120c_M$ driven by actuators $120b_1, 120b_2, \ldots 120b_M$. The light having the changed light path passes through projection lens 118 and displays an image on a screen.

That is, the parallel light which has been passed through field lens 117 is condensed by micro lenses $130a_1, 130a_2, \ldots 130a_M$ of micro lens portion 130a of micro lens array 130 corresponding to a pixel. The condensed light reaches mirror surface 120c of actuated mirror array 120. When an image signal is applied to actuated mirror array 120, the transistors which are the switching elements of mirror array panel 120a begin to operate by the image signal applied thereof. By operating the transistors, actuators $120b_1, 120b_2, \ldots 120b_M$ of actuator portion 120b are deformed. As a result, mirror surfaces $120c_1, 120c_2, \ldots 120c_M$ are driven by actuators $120b_1, 120b_2, \ldots 120b_M$ of actuator part 120b. Then, the light incident to mirror surfaces $120c_1, 120c_2, \ldots 120c_M$ is reflected by mirror surfaces $120c_1, 120c_2, \ldots 120c_M$ driven by deforming of actuators $120b_1, 120b_2, \ldots 120b_M$. The light having the changed light path obtained by deforming actuator part 120b passes through other micro lenses $130a_2, 130a_3, \ldots 130a_{M+1}$ adjacent in a row direction (or in a column direction) to micro lenses $130a_1, 130a_2, \ldots 130a_M$ corresponding to the light. Thereafter, the light is condensed by field lens 117, passes through projection lens 118 and displays an image on the screen.

Meanwhile, if actuators $120b_1, 120b_2, \ldots 120b_M$ are not deformed and mirror surfaces $120c_1, 120c_2, \ldots 120c_M$ are not driven by actuators $120b_1, 120b_2, \ldots 120b_M$, the reflected light passes through micro lenses $130a_1, 130a_2, \ldots 130a_M$, which correspond to the reflected light, and is projected to reflection mirror 114. The light projected to reflection mirror 114 is not displayed on the screen.

Projection lens 118 consists of a concave lens and a convex lens. Projection lens 118 adjusts an angle of the light passing through projection lens 118 and controls the size of an image displayed on the screen.

In the optical system of the projection type image display apparatus according to the first embodiment of the present invention as described above, the light projection method will be concretely described below.

A light reflected from light source 110, which is an arc discharging lamp, is condensed by a semi-circle or semi-elliptical condensation mirror 112 and is reflected by reflection mirror 114. Thereafter, the light reflected from reflection mirror 114 is collimated by field lens 117 and is converted to a parallel light. Then, micro lens array 130 disposed in the light path of the parallel light condenses the parallel light at a special position which is a position of the individual pixel previously designed. At this time, the parallel light is condensed by micro lenses $130a_1$, $130a_2$, ... $130a_M$ of micro lens part 130a of micro lens array 130 corresponding to the individual pixel unit. The condensed light reaches mirror surface portion 120c of actuated mirror array 120.

When an image signal for forming an image on the screen is applied to actuated mirror array 120, the transistors, which are the switching elements of mirror array panel 120a, begin to operate by the image signal applied to actuated mirror array 120. By operating the transistors, actuators $120b_1$, $120b_2$, ... $120b_M$ of actuator portion 120b are deformed. As a result, mirror surfaces $120c_1$, $120c_2$, ... $120c_M$ are driven by actuators $120b_1$, $120b_2$, ... $120b_M$ of actuator portion 120b.

Then, the light incident to mirror surfaces $120c_1$, $120c_2$, ... $120c_M$ is reflected by mirror surfaces $120c_1$, $120c_2$, ... $120c_M$ driven by actuators $120b_1$, $120b_2$, ... $120b_M$. If an image signal applies to one actuator $120b_x$ of actuator portion 120b, mirror surface $120c_x$ is driven by actuator $120b_x$. Thereby, the light path of the light changes into a new light path. Then, the reflected light passes through micro lens $130a_{x+1}$ adjacent in a row to micro lens $130a_x$ corresponding to the reflected light, and is condensed by field lens 117. Thereafter, the light passes through projection lens 118 and displays an image on the screen (not shown).

Meanwhile, if actuator $120b_y$ has not deformed and mirror surfaces $120c_y$ corresponding to actuator $120b_y$ is not driven by actuator $120b_y$, the light reflected passes through micro lens $130a_y$, and is projected to reflection mirror 114. The light projected onto reflection mirror 114 does not display an image on the screen.

Thereafter, the light having the changed light path passes through projection lens 118 and displays an image on the screen.

As described above, in the preferred embodiment according to the present invention, the micro array is installed to the front surface of the actuated mirror array in the optical system of the projection type image display apparatus. Thereby, light modulation at the individual pixel can be easily accomplished. Further, the brightness of the image displayed on the screen is increased by collimating and reflecting of the projected light by using the micro lens.

In the optical system of the projection type image display apparatus according to the prior art, one stop has been used to modulate the incident light. Therefore, the optical design of the optical system is highly limited. In contrast, in the optical system of the projection type image display apparatus according to the present invention, a micro array has been used to modulate the incident light at a pixel unit.

Accordingly, the optical design of the optical system is not limited to a predetermined range.

Embodiment 2

Figure 3:
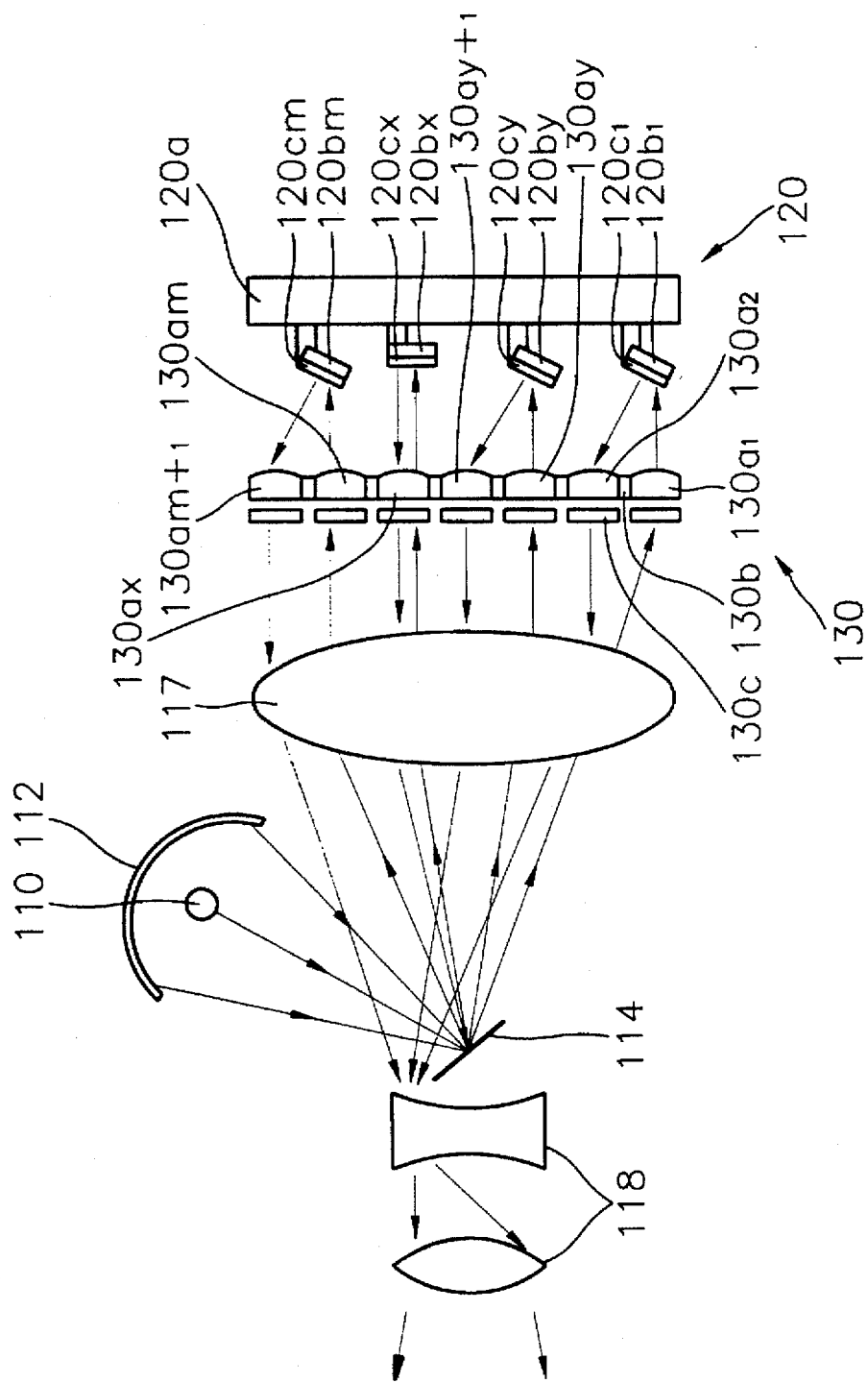
FIG. 3 is a schematic view of an optical system of a projection type image display apparatus according to a second embodiment of the present invention.

FIG. 3 schematically illustrates the optical system of the projection type image display apparatus according to a second embodiment of the present invention. The projection type image display apparatus according to the second embodiment of the present invention is capable of creating a color more easily than the projection type image display apparatus according to the first embodiment of the present invention. For the same constitution element, the reference numerals used in the second embodiment of the present invention are the same as the reference numerals used in the first embodiment of the present invention.

Referring to FIG. 3, the projection type image display apparatus according to the second embodiment of the present invention is the same as the projection type image display apparatus according to the first embodiment of the present invention except for an additional constitution element. The additional constitution element is a micro color filter array 130c for displaying a color image on the front surface of micro lens array 130.

The optical system of the projection type image display apparatus according to the second embodiment of the present invention will be concretely described in below.

The light emitted from light source 110 is condensed by condensing mirror 112 enclosing the halogen lamp, and is reflected by reflection mirror 114 at a specific angle. The light reflected from reflection mirror 114 is collimated by field lens 117, and is incident to micro lens array 130 in the form of a parallel light. Thereafter, the light is projected to actuated mirror array 120.

At this time, micro color filter 130c mounted to the front surface of lens part 130a of micro lens array 130 allows for selective penetration by only a light having a special color among the lights which have been passed through field lens 117.

Micro color filter 130c is well known in the technical field of liquid crystal display devices and in the related art. The array of micro color filter 130c corresponds to micro lens array 130 in the one-to-one manner. That is, micro color filter 130c can be formed in the form of a two-dimensional matrix such as lens portion 130a formed in the form of a two-dimensional matrix. Each of micro color filter 130c is disposed to selectively allow the red, green and blue light in the two-dimensional matrix to penetrate. In micro color filter 130c, only light having a selected color passes through lens portion 130a of micro lens array 130 and is collimated to a special position corresponding to the individual pixel. Meanwhile, actuated mirror array 120 consists of the two-dimensional AMA in the same manner as the first embodiment according to the present invention. The light projected by micro color filter 130c and micro lens portion 130a shows a selected color, and is reflected from mirror surface 120c of actuated mirror array 120 to control the light path corresponding to the predetermined pixels.

Figure 4:
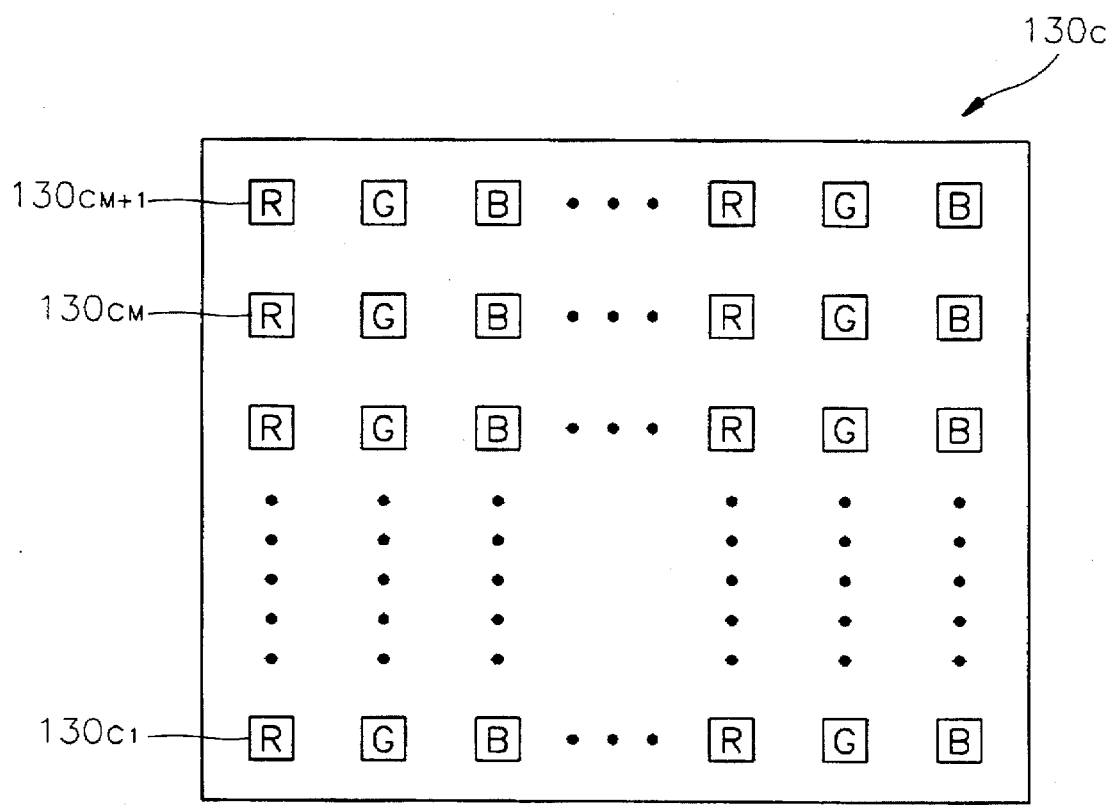
FIG. 4 is a schematic view for showing the reflection of red light, green light and blue light in a periodic array manner in positions corresponding to the individual pixel of the actuated mirror array of the projection type image display apparatus illustrated in FIG. 3.

FIG. 4 schematically illustrates the colors of the color filter array of the projection type image display apparatus illustrated in FIG. 3. As shown in FIG. 4, red (R), green (G) and blue (B) light are periodically disposed at a position corresponding to the individual pixel of actuated mirror array 120 in a row direction. Micro color filter array 130c has an (M+1)×N filter correspondingly to micro lens $130a_1$, $130a_2$, ... $130a_{M+1}$ of micro lens portion 130b. Micro color filter array 130c is disposed in the manner that micro lens $130a_x$ through which the light condensed in the pixel unit has passed, has a color of the same with micro lens $130a_{x+1}$ through which the light having a changed light path obtained by the tilted mirror $120c_x$ passes. By disposing micro color filter array 130c as described above, the color of the incident light agrees with the color of the light modulated. Thus, a light having a specific color can be selected from the parallel light before the parallel light is condensed to thereby display a desired color image. Accordingly, it is possible to form a pixel having a predetermined color by using red, green and blue color filter which are disposed in a horizontal line.

Although color filter array 130c is positioned at the field lens of micro lens array 130 in the second embodiment of the present invention, color filter array 130c is constituted by forming a color coating layer in the array as shown in FIG. 4 on the lens surface of micro lenses $130a_1$, $130a_2$, . . . $130a_{M+1}$. In this case, a light having a specific color can be selected from the parallel light after the parallel light is condensed, to thereby display a desired color image.

According to the second embodiment of the present invention, it is possible to modulate the light at the pixel unit by installing the micro lens array to the front surface of the actuated mirror array in the optical system. Also, since the incident light is condensely reflected by the micro lens, the brightness of an image displayed on the screen is heightened. Further, the prior an required at least three actuated mirror arrays in order to create a color. In the second embodiment of the present invention, by installing the micro color filter to the micro lens, it is possible to create a color while employing only one actuated mirror array.

While the present invention has been particularly shown and described with reference to a particular embodiment thereof, it will be understood by those skilled in the an that various changes in form and details may be effected therein without departing from the spirit and scope of the invention as defined by the appended claims.

What is claimed is:

1. A light projection method in a projection type image display apparatus, the light projection method comprising the steps of:

(a) reflecting a light generated from a light source of optical energy;

(b) collimating the reflected light to transform the reflected light into a parallel light;

(c) condensing the parallel light in a pixel unit by using a first micro lens of a micro lens array comprising peripheries;

(d) controlling a light path of the condensed light by using a mirror of an actuated mirror array so that the condensed light corresponds to the pixel unit; and (e) passing the condensed light which has the controlled light path through a second micro lens adjacent to the first micro lens to form an image on a screen.

2. A light projection method as claimed in claim 1, wherein said micro lens array includes (M+1)×N micro lenses, said actuated mirror array includes M×N mirrors, actuators for supporting and driving said mirrors, and transistors for driving said actuators, wherein M and N are positive integers.

3. A light projection method as claimed in claim 1, said method further comprising the step of selecting a light having a specific color from the parallel lights before the step of condensing the parallel light.

4. A light projection method as claimed in claim 1, said method further comprising the step of selecting a light having a specific color from the parallel lights after the step of condensing the parallel light.

5. A projection type image display apparatus comprising:

a light source for generating a light;

a condensing means for uniformly condensing the light, said condensing means having a micro lens array comprising perpheries and having a plurality of micro lenses which are arranged in a matrix form for condensing the light into pixel units; and a light modulation means for forming an image by controlling a light path of the condensed light which has passed through said condensing means.

6. A projection type image display apparatus as claimed in claim 5, said apparatus further comprising:

a light reflecting means for reflecting the light generated from said light source; and a parallel light transforming means for collimating the light reflected by said light reflecting means to transform the light into a parallel light.

7. A projection type image display apparatus as claimed in claim 5, wherein the condensed light in a pixel unit which has passed a first micro lens of the micro lens array, is reflected by said light modulating means to pass a second micro lens adjacent to the first micro lens, thereby forming the image.

8. A projection type image display apparatus as claimed in claim 5, wherein said condensing means has a micro lens array having a plurality of micro lenses which are arranged in a stripe form for condensing the light into a row unit of pixel units which are arranged in a matrix form.

9. A projection type image display apparatus as claimed in claim 8, wherein said micro lens array is disposed in a predetermined manner such that the collimated light in a pixel unit passing through a first micro lens of said micro lens array is reflected by said actuated mirror array, passes through a second micro lens of said micro lens array, and forms the image.

10. A projection type image display apparatus as claimed in claim 5, said projection type image display apparatus further comprising a projection lens for displaying an image having a suitable size on a screen before the light reflected by said actuated mirror army displays the image on the screen.

11. A projection type image display apparatus as claimed in claim 5, wherein said light modulation means includes a plurality of mirror surfaces, a plurality of actuators for respectively supporting and driving said mirror surfaces, and a panel having transistors for driving said actuators by receiving an image signal.

12. A projection type image display apparatus as claimed in claim 5, wherein said light modulation means includes a mirror part having a plurality of mirrors disposed in the form of a matrix corresponding to M×N pixels, said condensing means has a micro lens array having (M+1)×N micro lenses disposed in the form of a matrix, and the light reflected by each of said mirrors passes through a second micro lens adjacent in a row direction to a first micro lens through which the light has passed, thereby forming an image, wherein M and N are positive integers.

13. A projection type image display apparatus as claimed in claim 12, said projection type image display apparatus further comprising a color filter array, in which said color filter array includes color filters corresponding to said micro lenses for forming a color image at positions corresponding to said micro lenses.

14. A projection type image display apparatus comprising:

a light source for generating a light;

a light reflecting means for reflecting the light generated from said light source;

a parallel light transforming means for collimating the light reflected by said light reflecting means to transform the light into a parallel light;

a micro lens array comprising peripheries and including a plurality of micro lenses for condensing the parallel light in a pixel unit, in which said micro lenses are (M+1)×N micro lenses disposed in a form of a matrix;

an actuated mirror array for forming an image by controlling a light path of the condensed light passing through said micro lens array, in which said actuated mirror array includes a plurality of mirror surfaces having a plurality of mirrors disposed in the form of a matrix corresponding to M×N pixels, M×N actuators for respectively supporting and driving said mirror surfaces, and M×N transistors for driving said actuators by receiving an image signal, wherein M and N are positive integers; and a projection lens for forming an image having a suitable size on a screen before the light reflected by said actuated mirror array is displayed on the screen.

15. A projection type image display apparatus as claimed in claim 14, said projection type image display apparatus further comprising a color filter array, in which said color filter array includes color filters corresponding to said micro lenses for forming a color image at positions corresponding to said micro lenses.

16. A projection type image display apparatus as claimed in claim 15, wherein said color filters of said color filter array are disposed in a manner such that a color of a micro lens which allows the condensed light in a pixel unit to pass through is the same as a color of another micro lens which is adjacent to the micro lens, and which allows the light having a changed light path to pass through by a mirror corresponding to the light in said actuated mirror array.

* * * * *